United States Patent [19]

Wakita et al.

[11] Patent Number: 5,010,327
[45] Date of Patent: Apr. 23, 1991

[54] METHOD OF DRIVING A LIQUID CRYSTAL MATRIX PANEL

[75] Inventors: Naohide Wakita, Kobe; Tsuyoshi Uemura, Higashiosaka; Hiroyuki Ohnishi, Ikeda; Noriko Ohba, Nara; Isao Ota, Osaka; Shingo Fujita, Katano, all of Japan

[73] Assignee: Matsushita Electric Industrial Co., Ltd., Osaka, Japan

[21] Appl. No.: 903,773

[22] Filed: Sep. 5, 1986

[30] Foreign Application Priority Data

Sep. 6, 1985 [JP] Japan ............................. 60-198010
Sep. 6, 1985 [JP] Japan ............................. 60-198012
May 9, 1986 [JP] Japan ............................. 61-107003

[51] Int. Cl.$^5$ ............................................. G09G 3/36
[52] U.S. Cl. .................................. 340/784; 340/305
[58] Field of Search ............... 340/784, 805; 350/330, 350/331 R, 331 T, 332, 333, 350 S, 347 R

[56] References Cited

U.S. PATENT DOCUMENTS

| | | | |
|---|---|---|---|
| 3,835,463 | 9/1974 | Tsukamoto et al. | 340/784 |
| 3,960,438 | 6/1976 | Bonne et al. | 350/347 R |
| 4,082,430 | 4/1978 | Schulthess et al. | 340/784 |
| 4,116,543 | 9/1978 | Stein | 340/784 |
| 4,417,785 | 11/1983 | Nakamura | 350/346 |
| 4,508,429 | 4/1985 | Nagae et al. | 350/332 |
| 4,655,550 | 4/1987 | Crossland et al. | 340/784 |
| 4,668,051 | 5/1987 | Mourey et al. | 350/350 S |
| 4,709,995 | 12/1987 | Kuribayashi et al. | 350/350 S |

FOREIGN PATENT DOCUMENTS

| | | |
|---|---|---|
| 149398 | 7/1985 | European Pat. Off. . |
| 149899 | 7/1985 | European Pat. Off. . |
| WO87/02495 | 4/1987 | PCT Int'l Appl. ......... 340/332 |
| 2020075 | 11/1979 | United Kingdom ........ 340/805 |

OTHER PUBLICATIONS

"Submicrosend Bistable Electro-Optic Switching in Liquid Crystals", by N. A. Clark et al., Applied Physics Letters, vol. 36, No. 11 (Jun. 1, 1980), pp. 899-901.
"Fast and Bistable Electro-Optic Displays Using Ferroelectric Liquid Crystals", by N. A. Clark et al., 1984 Eurodisplay, pp. 73-76.
"An Application of Chiral Smectic-C Liquid Crystal to a Multiplexed Large-Area Display", by T. Harada et al., 1985 SID International Symposium Digest of Technical Papers (May 1, 1985), pp. 131-134.

Primary Examiner—Alvin E. Oberley
Attorney, Agent, or Firm—Wenderoth, Lind & Ponack

[57] ABSTRACT

An improved driving method capable of achieving high-quality display even in simple matrix addressing for a ferroelectric liquid crystal matrix panel at a high multiplex ratio applies pulses of a frequency higher than that of a scanning voltage in an addressed condition to a scanning electrode in a non-addressed condition to gain either a surface stabilizing effect or an AC field stabilizing effect, hence ensuring high-contrast display. And the panel is so driven that the temporal average of the voltage applied to each pixel becomes zero, thereby averting deterioration of the liquid crystal.

9 Claims, 7 Drawing Sheets

METHOD OF DRIVING A LIQUID CRYSTAL MATRIX PANEL

BACKGROUND OF THE INVENTION

1. Field of the Invention

The present invention relates to a method of driving a liquid crystal matrix panel having a ferroelectric liquid crystal layer.

2. Description of the Prior Art

There has lately been reported the availability of a ferroelectric liquid crystal panel which has a high response speed and a memory function.

Hereinafter a conventional ferroelectric liquid crystal panel will be described. In a ferroelectric liquid crystal panel, slender molecules arrayed in layers are aligned at a fixed angle $\theta$ of inclination to a layer normal, and a dipole moment exists in the direction perpendicular to both the molecular major axis and the layer normal, so that the ferroelectric liquid crystal has a spontaneous polarization when formed into a thin film. ["Submicrosecond bistable electro-optic switching in liquid crystals" by N. A. Clark et al., Applied Physics Letters, Vol. 36 No. 11 (June 1, 1980), pp. 899-901]. When an electric field is applied to a ferroelectric liquid crystal cell shaped into a thin film, the molecules are placed in two states which are substantially horizontal to the substrate and have angles $\pm\theta$ of inclination to the layer normal depending on the direction of application of a voltage, so that light and dark tones can be realized by utilizing the birefringence or dichroism based on the electro-optical effect. An intermediate tone can be realized by a condition where the two states are intermingled and mottled in pixels. In the cell shaped to be sufficiently thin, the above two states are still maintained even after removal of the electric field due to the interaction of the molecules and the substrate surface. Such a cell is called a surface stabilized ferroelectric liquid crystal (SSFLC). ["FAST AND BISTABLE ELECTRO-OPTIC DISPLAYS USING FERROELECTRIC LIQUID CRYSTALS" by N. A. Clark et al., 1984 EURODISPLAY, pp. 73-76].

Figure 1:
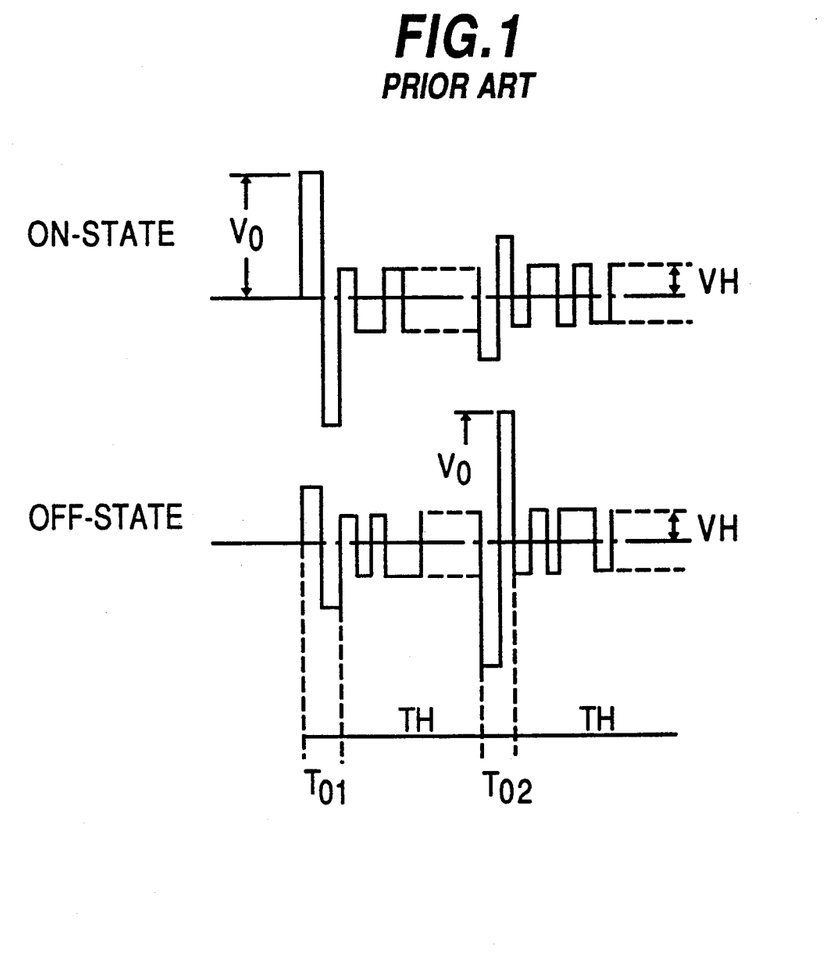
FIG. 1 is a waveform chart showing an exemplary conventional driving method.

With regard to the matrix addressing method for the ferroelectric liquid crystal panel of the above-described structure, there is known a modification of the conventional amplitude selection scheme used for nematic crystal panels. ["An Application of Chiral Smectic-C Liquid Crystal to a Multiplexed Large-Area Display" by T. Harada et al., 1985 SID INTERNATIONAL SYMPOSIUM DIGEST of TECHNICAL PAPERS (May 1, 1985), pp. 131-134]. FIG. 1 shows a driving waveform in such a method. In this example, one scanning consists of two frames with pulses of mutually different polarities, and each frame is based on the 4:1 selection scheme. An AC voltage ($\pm V_O$) which can switch a pixel's state is applied to an ON pixel in an addressed period $T_{O1}$ of the first frame, and a polarity-inverted AC voltage ($\mp V_O$) is applied to an OFF pixel in an addressed period $T_{O2}$ of the second frame. In a non-addressed period $T_H$ of each frame, an AC bias voltage ($\pm V_H$) is applied to both pixels. It follows, therefore, that depending on the display pattern, the voltage applied in a non-addressed condition has double the pulse duration of each write pulse in an addressed condition. Since the molecules in the ferroelectric liquid crystal are movable more readily as the pulse duration becomes longer even when the applied voltage is the same, the pixel state is disturbed by the longer-duration pulses to consequently deteriorate the contrast. Although such deterioration is preventable by reducing the bias ratio, the on-off voltage ratio also becomes smaller so that proper display is rendered impossible unless the panel threshold characteristic is steep. Generally, when alignment is effected by rubbing, the voltage-to-transmittance characteristic becomes gentler in comparison with any cell aligned by shearing or the like through the process without substrate surface treatment, whereby the bias ratio cannot be reduced so much in the driving based on the conventional amplitude selection scheme used for nematic crystal panels. Practically, in an experiment conducted with regard to a panel where a mixture of ester ferroelectric liquid crystals is aligned by rubbing between substrates spaced apart from each other by a distance of 2.5 $\mu$m, the contrast achieved was extremely low when such panel was driven by the conventional method of FIG. 1 at a multiplex ratio exceeding 100 under any conditions. The above problem is common to any driving method conforming to the conventional amplitude selection scheme used for nematic crystal panels. Furthermore, in the example of FIG. 1 where an on-pixel is written in the first frame and an off-pixel in the second frame respectively, an erroneous display is caused in the first frame in such a manner that new data overlaps the on-pixel of the preceding scanning, and when one scanning time is long or any motion picture is displayed, such overlap is visually seen so as to consequently bring about a deterioration of the display quality.

The surface stabilizing effect is diminished with an increase of the thickness of the cell. Relative to this problem, there is reported the effect of an AC field-stabilized state which is attained by applying a high-frequency AC electric field to a ferroelectric liquid crystal of negative dielectric anisotropy and thereby maintaining the molecules in parallel with the substrate by the dielectric anisotropy and the field effect. ["A Multiplexed Ferroelectric LCD Using ac Field-Stabilized State" by J. M. Geary, 1985 SID INTERNATIONAL SYMPOSIUM DIGEST of TECHNICAL PAPERS (May 1, 1985), pp. 128-130]. According to the above, first the entire matrix panel is once placed in its off-state and then an AC sinusoidal waveform is superposed on the driving waveform used in the conventional amplitude selection scheme. However, since the display is extinguished every time the picture plane is rewritten, the time required for appearance of the next display becomes different depending on the position in the panel if frequent sudden changes occur in the display, whereby a uniform display is rendered impossible. Furthermore, due to superposition of the AC waveform also on the write pulses in the addressed condition, the write pulse duration becomes short to bring about an undesired condition where the molecules are not readily movable.

SUMMARY OF THE INVENTION

In view of the problems mentioned above, it is an object of the present invention to provide a liquid crystal matrix panel driving method which is capable of achieving high-quality display even in simple matrix addressing for a ferroelectric liquid crystal panel at a high multiplex ratio.

For the purpose of attaining the above object in a liquid crystal matrix panel driving method which forms a matrix of pixels with a ferroelectric liquid crystal material held between electrodes, the feature of this invention resides in the fact that pulses of a frequency higher than that of a scanning voltage in an addressed condition are applied to a scanning electrode in a non-addressed condition, and the time average of a voltage applied to each pixel becomes zero.

Particularly when the dielectric anisotropy of the ferroelectric liquid crystal is negative, it is preferred that the effective value of the pulse voltage applied to the pixel be substantially constant regardless of the display pattern and higher than the effective threshold voltage at which the effect of stabilizing the molecular orientation by the dielectric anisotropy is achieved.

Due to the above arrangement, the pixel in the addressed condition is placed in a desired state by long-duration pulses, while in the non-addressed condition, such a state of the pixel is maintained by applying pulses of a high frequency which makes spontaneous polarization impossible, hence realizing a high-quality display even at a high multiplex ratio while averting a deterioration of the liquid crystal panel that may otherwise be induced by some electrochemical reaction.

Particularly when the ferroelectric liquid crystal has a negative ferroelectric anisotropy, a satisfactory memory function is obtainable by the AC field stabilizing effect for any display pattern.

DESCRIPTION OF THE PREFERRED EMBODIMENTS

Figure 2:
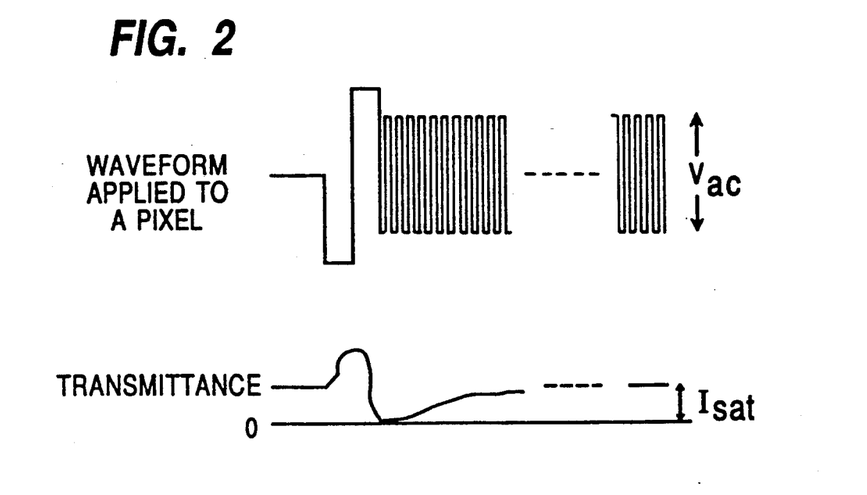
FIG. 2 is a driving waveform chart showing the fundamental conception of the present invention.
Figure 3:
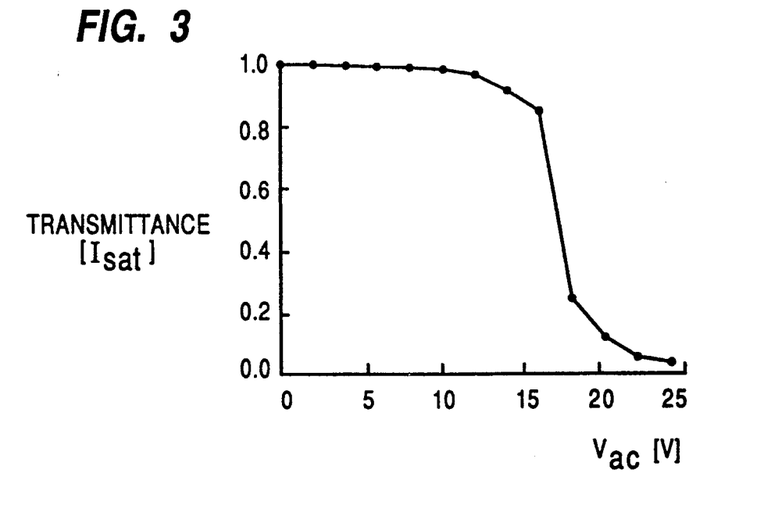
FIG. 3 graphically shows an optical characteristic representing the relationship between the effective voltage obtained in the driving waveform of FIG. 2 and the transmittance retained.

In a cell having a thickness of 3.5 μm with ferroelectric liquid crystals of negative ferroelectric anisotropy aligned therein by rubbing, no surface stabilizing effect is attained but an AC field stabilizing effect is gained. An optical characteristic of FIG. 3 is obtained in measuring the transmittance Isat after the passage of a sufficient time from application of high-frequency AC pulses of an amplitude Vac after turning off the pixels by the long-duration AC pulses shown in FIG. 2, and it has been found that in the process of increasing the amplitude Vac of the high-frequency AC voltage, the transmittance begins to be retained suddenly at 18 volts. This suggests that a threshold voltage is existent in the memory effect derived from dielectric anisotropy, and also that the display quality is enhanced when the effective voltage applied to the liquid crystal is higher than the effective threshold voltage.

Figure 4A:
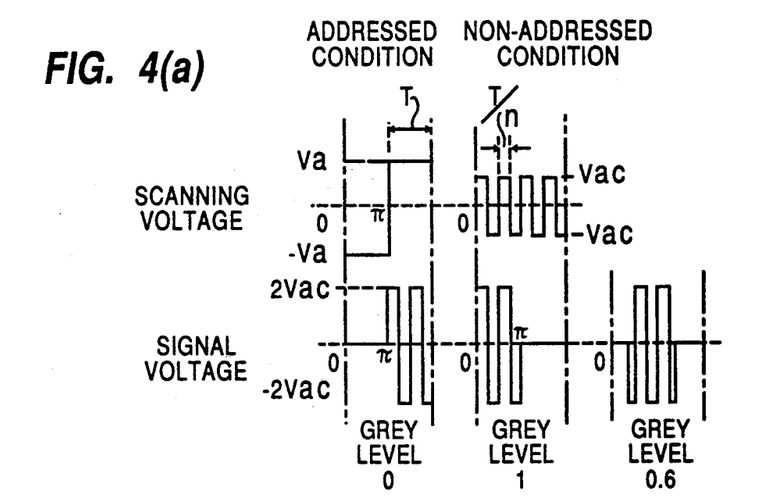
FIGS. 4(a), 4(b), 5 and 6 show driving waveforms in a first embodiment of the present invention.
Figure 4B:
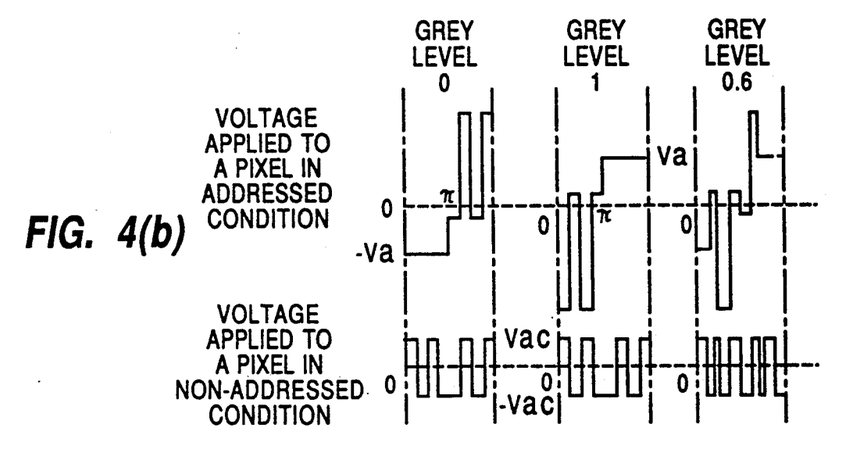
Figure 5:
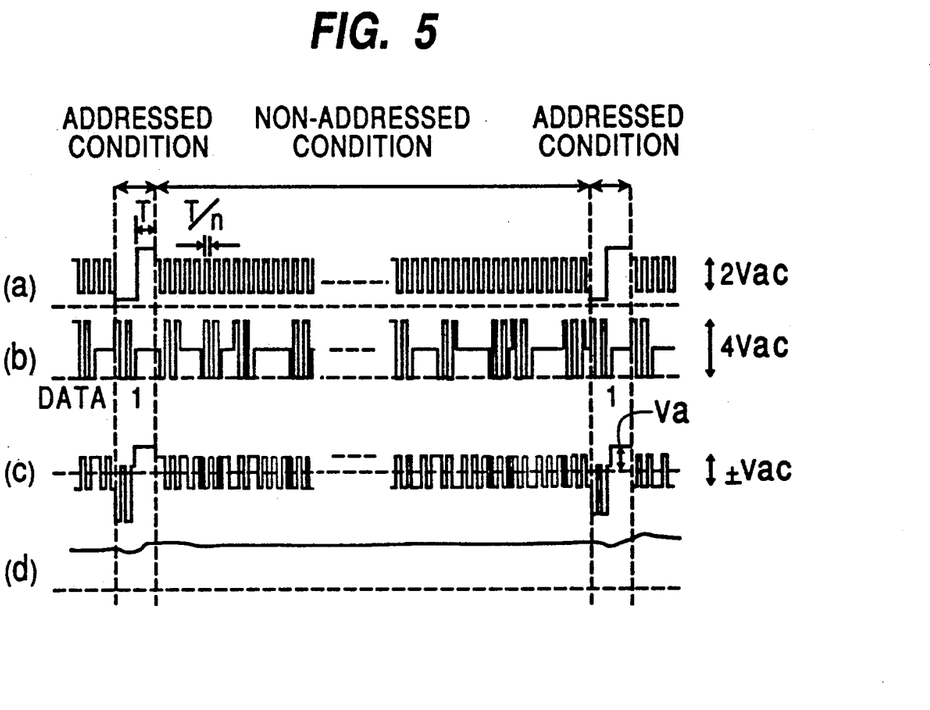
Figure 6:
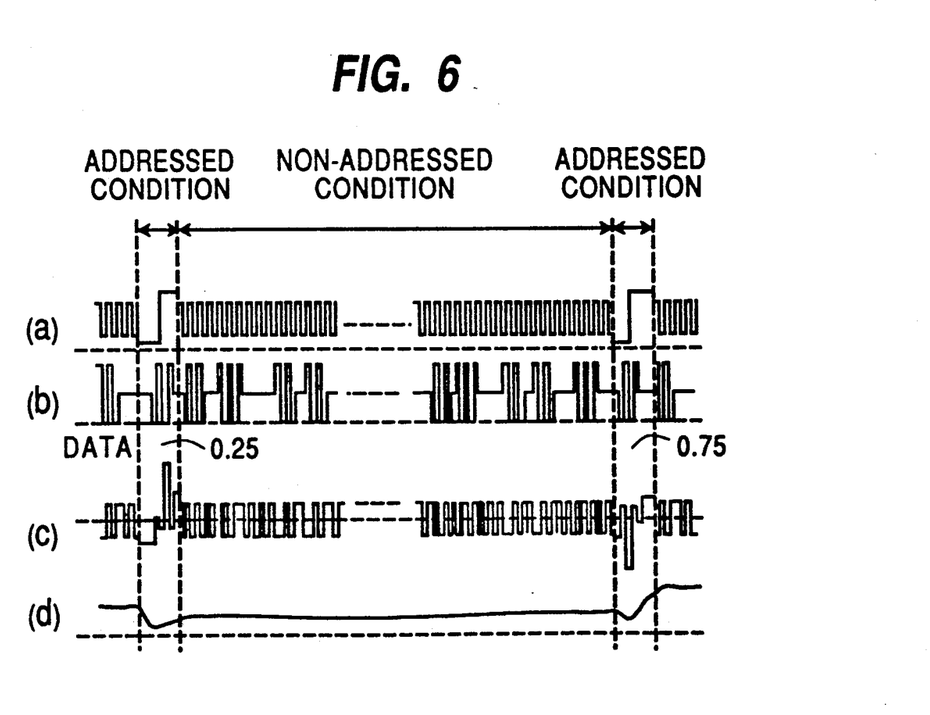

FIGS. 4(a)–4(b) show exemplary waveforms in the driving method of this invention, in which FIG. 4(a) represents the voltages applied to electrodes, and FIG. 4(b) represents the voltage applied to a pixel for one selected time (hereinafter referred to as 1 H). In FIG. 4 (a), low-frequency AC pulses having an amplitude Va and a pulse duration T (=H/2) are applied to a scanning electrode in the addressed condition, and high-frequency AC pulses having an amplitude Vac and a pulse duration T/n (n is a positive integer greater than 2) are applied thereto in the non-addressed condition. Meanwhile high-frequency pulses having an amplitude 2Vac and synchronized with the scanning voltage in the non-addressed condition are applied to a signal electrode for an n/2 period from the start phase corresponding to the grey level, and the signal voltage is maintained at 0 volts during the remaining period. The phase starting from $\pi$ at grey level 0 leads with an increase of the grey level and comes to start from 0 at grey level 1. During this time, the voltage (FIG. 4 (b)) applied to a pixel in the addressed condition includes both low-frequency pulses and high-frequency pulses. For example, at grey level 0, the pixel is rendered dark by the low-frequency pulses of the first half voltage −Va volts and is not changed by the high-frequency pulses of the latter half. In accordance with subsequent increase of the grey level, the low-frequency pulses of +Va volts come to have a longer duration (at grey level 0.6) to consequently render the pixel light. At grey level 1, the existing low-frequency pulses are merely those of +Va volts. In the non-addressed condition, the high-frequency pulses applied remain unchanged at any grey level. Therefore, the frequency is selectively raised so as not to permit spontaneous polarization, and Vac is increased for applying an effective value greater than the aforesaid effective threshold voltage so that the pixel state caused in the addressed condition is retained. FIGS. 5 and 6 show driving waveforms obtained when the waveform of FIG. 4 is actually applied to the aforementioned ferroelectric liquid crystal panel, in which: (a) represents a scanning voltage, (b) a signal voltage, (c) a voltage applied to a pixel, and (d) a transmitted amount of light. When no change occurs in the display pattern as shown in FIG. 5 (d), the transmitted amount of light varies little in the addressed condition as well as in the non-addressed condition, so that almost no flicker is observed if the field frequency is below 30 Hz. Furthermore, since writing is completed by one scanning operation as shown in FIG. 6 (d), the time of one scanning operation becomes double the product of the response time of the liquid crystal and the number of scanning lines, hence reducing to half the value of the conventional example shown in FIG. 1. It has been experimentally confirmed that a remarkably excellent display having a contrast ratio 15 at a duty factor 1/1000 is achieved on a matrix display panel under the conditions including Va of 25 volts, Vac of 20 volts, T of 400 to 800 μsec and n of 4 or more.

Although Vac is as high as 20 volts in this embodiment, a lower driving voltage may be applicable as well if the dielectric anisotropy of the liquid crystal material becomes greater in absolute value.

In any panel where the cell is smaller than 2.5 μm in thickness and surface stabilizing effect is gained, it has been confirmed that, even if the dielectric anisotropy of the liquid crystal is zero or positive, the driving method of this invention is more effective than the conventional method. In the experiment, Vac was set within a range of 10 to 15 volts, and the other conditions were substantially the same as those in the foregoing case. Besides the exemplary embodiment of FIG. 4, a similar effect is attainable despite changes in the amplitude, phase and duration of the high-frequency pulses which provide a signal voltage, and it is to be understood that the present invention is not limited to the embodiment of FIG. 4 alone.

Figure 7A:
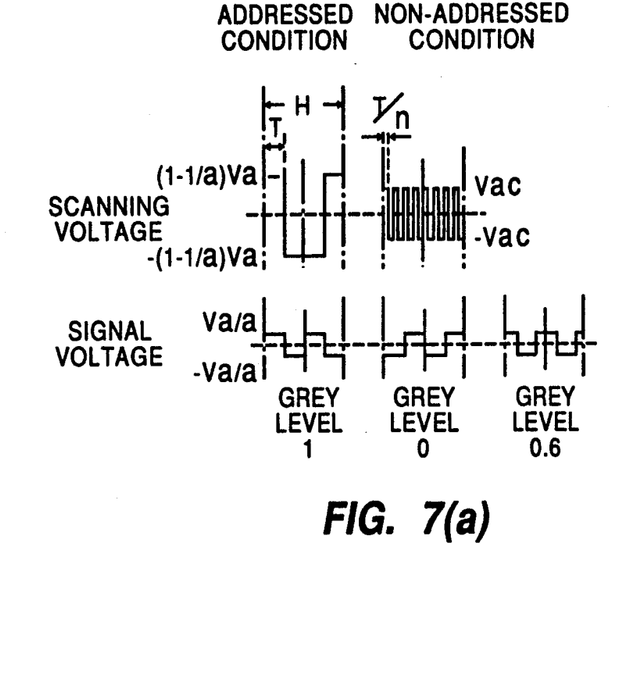
FIGS. 7(a), 7(b) and 8(a), 8(b) show driving waveforms in a second embodiment of the invention.
Figure 7B:
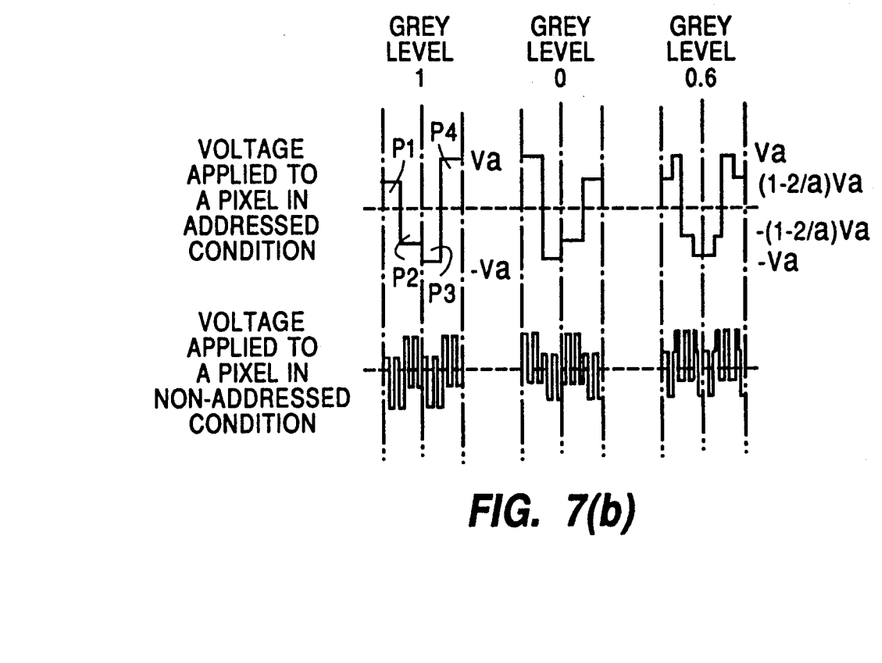
Figure 8A:
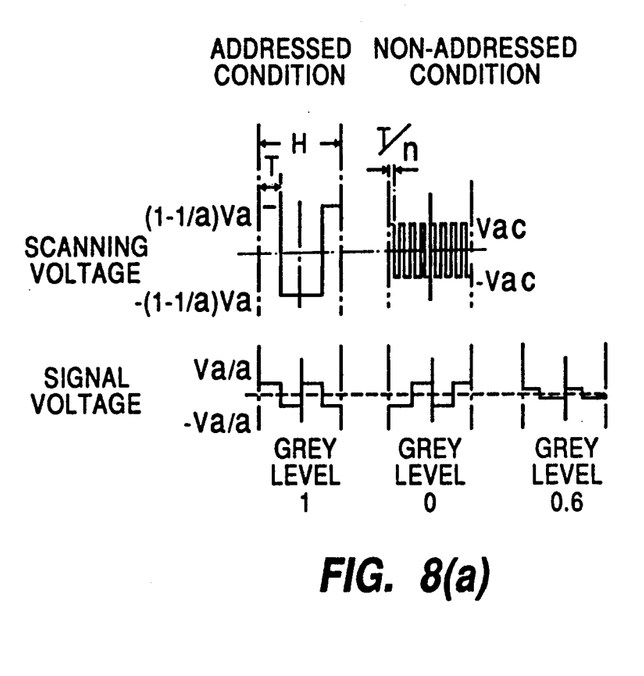
Figure 8B:
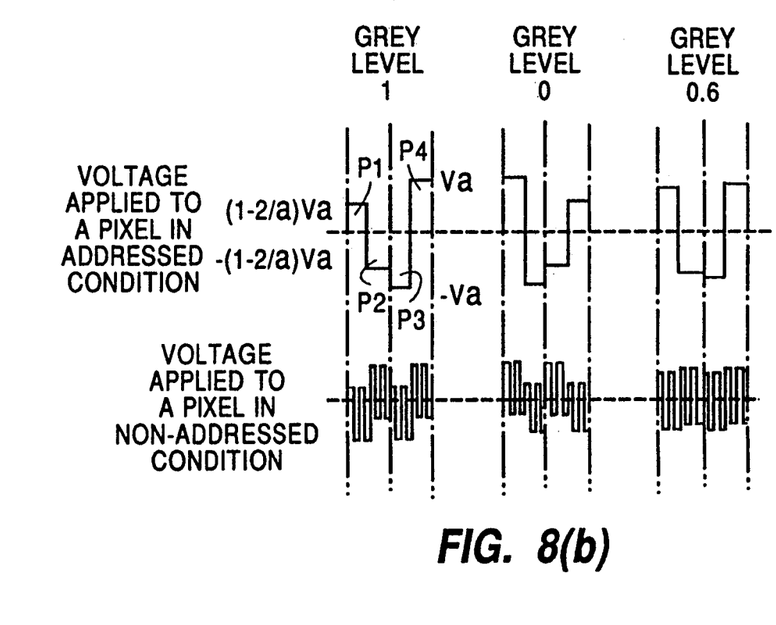

FIGS. 7(a)-7(b) show exemplary waveforms in a second embodiment of the present invention, in which FIG. 7(a) represents a voltage applied to electrodes, and FIG. 7(b) a voltage applied to a pixel simultaneously therewith. In the addressed condition, the scanning voltage applied to a scanning electrode has an amplitude $(1-1/a)Va$, and the signal voltage applied to a signal electrode has an amplitude $Va/a$, where a is a bias ratio which is a real number of 2 or larger. The phase of the signal voltage is changed according to the grey level. When the phase of the signal voltage coincides with that of the scanning voltage in an addressed condition, the voltage applied to a pixel in the addressed condition becomes $(1-2/a)Va$. When the phases of the signal and scanning voltages are different by 180° from each other in the addressed condition, the voltage applied to the pixel becomes Va. According to this driving method, two series P1–P2 and P3–P4 of AC pulses mutually different in both polarity and voltage are applied to a pixel in the addressed condition. The pixel is reset by P2 and P3 and its desired transmittance is obtainable in one scanning operation by P4 whose pulse duty factor of the on-voltage Va and the off-voltage $(1-2/a) \times Va$ is changed in accordance with the grey level. In the non-addressed condition, a combination of a low-frequency bias voltage $(\pm Va/a)$ and a high-frequency AC voltage $(\pm Vac)$ superposed thereon is applied to the pixel for achieving satisfactory display of a higher contrast superior to the conventional method of FIG. 1, although the memory effect is somewhat diminished due to the bias voltage as compared with the driving waveform of FIG. 5. Since the average voltage is zero, there occurs no deterioration in the liquid crystal. In a panel having the same thickness of 3.5 μm as in the first embodiment, the contrast ratio achieved was 8 at a duty factor 1/400 under the conditions including on-voltage Va of more than 20 volts, bias ratio a of about 1/5, pulse duration T of 400 to 600 μsec, n a positive integer between 4 to 8, and Vac of 20 to 25 volts. In FIG. 7, pulses corresponding to the original grey level are applied in the latter half of 1 H while pulses of a complementary grey level are applied in the first half so that the low-frequency component $(\pm Va/a)$ of the voltage applied to the pixel in the non-addressed condition is formed into an AC voltage of a period 2T. However, the grey-scale signal may be furnished merely to the AC pulses in the latter half, and any pulses other than the last pulse P4 may be replaced mutually with respect to the sequence. Furthermore, as shown in FIGS. 8(a)-8(b), the bias voltage may be changed in accordance with the grey level. This invention is effective if the dielectric anisotropy of the liquid crystal is zero or positive as in the first embodiment, and it is not limited to the driving waveform of FIG. 7 alone.

Figure 9:
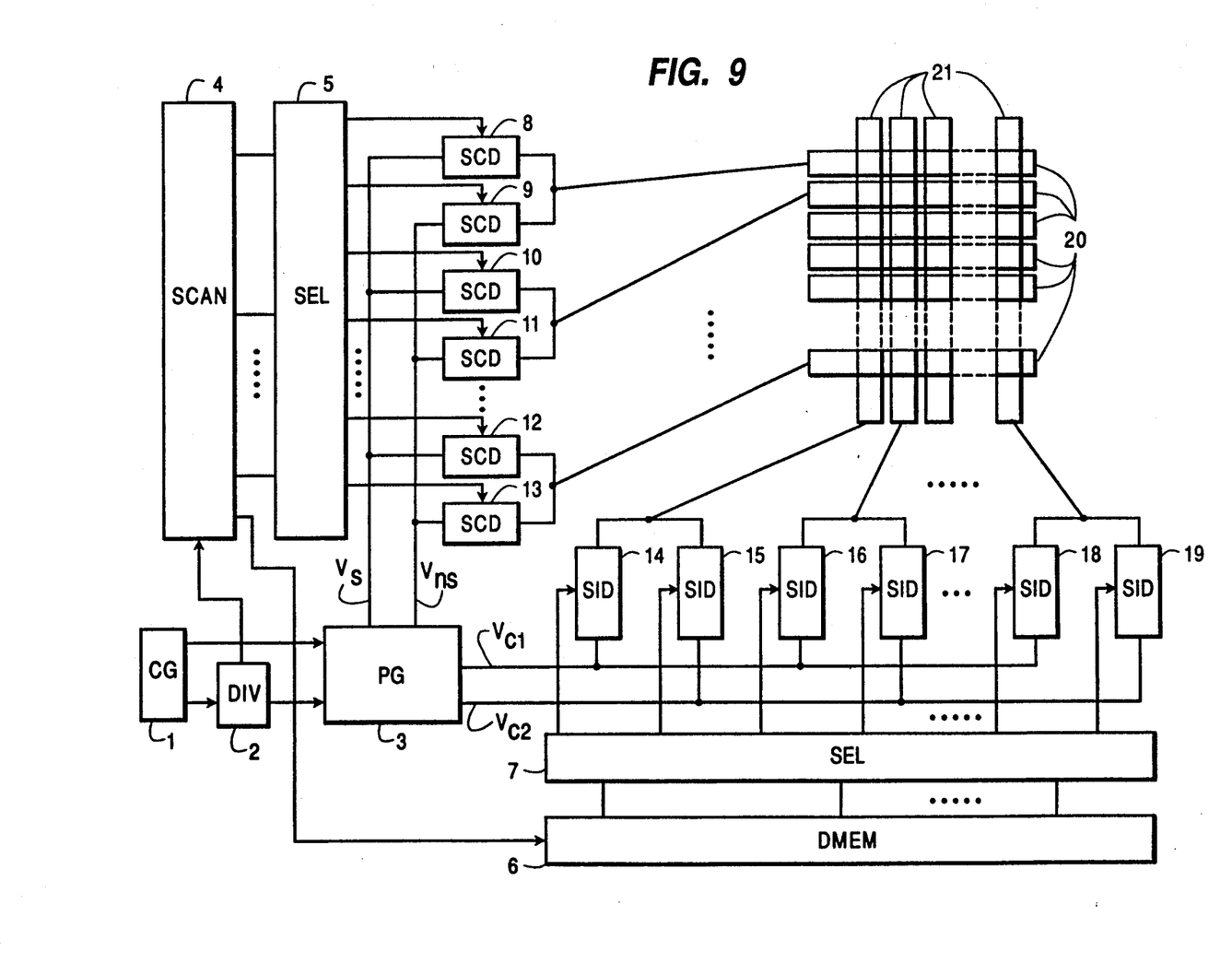
FIG. 9 is a block diagram of a display unit employed in the first and second embodiments of the invention.

FIG. 9 is a block diagram of a matrix display unit employed in the first and second embodiments. An analog switch in a basic pulse voltage generator (PG) 3 is turned on and off by a high-frequency clock and a low-frequency clock obtained from a basic clock generator (CG) 1 and a frequency divider (DIV) 2, thereby generating a selective scanning voltage Vs, a non-selective scanning voltage Vns, and grey-scale signal voltages Vc1, . . . , Vcn (n=2 in FIG. 9). Selection pulses for sequentially selecting the scanning electrodes 20 are produced from the output clock of the frequency divider 2 and are fed by a scanning circuit (SCAN) 4 and a selecting circuit (SEL) 5 to scanning-line driving circuits (SCD) 8–13, which then select, in response to such selection pulses, the scanning voltages obtained from the generator 3. Meanwhile signal-line driving circuits (SID) 14–19 select the signal voltages in response to selection pulses which are generated from a selecting circuit (SEL) 7 out of the data fed from a display memory (DMEM) 6, and drive the signal electrodes 21.

Figure 10:
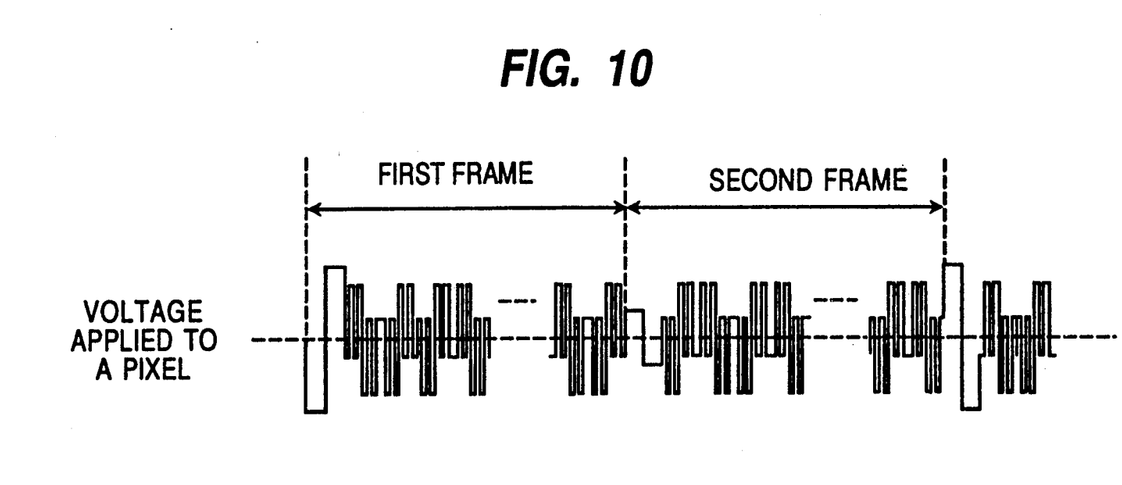
FIG. 10 shows a driving waveform in the embodiment of the invention.

As described hereinabove, the present invention is capable of achieving a high display quality in driving a ferroelectric liquid crystal matrix panel even at a high multiplex ratio. In addition, further effect is attainable in such a driving waveform that, as shown in FIG. 10, two series of AC pulses during one addressed condition in the second embodiment are applied through division for two scanning operations. It is to be understood that the present invention is not limited to the embodiments described above.

What is claimed is:

1. A method of driving a liquid crystal matrix panel where a ferroelectric liquid crystal having negative dielectric anisotropy is held between scanning electrodes and signal electrodes crossing the scanning electrodes to form a matrix of pixels at crossing positions of the scanning and signal electrodes, comprising the steps of:

applying signal voltage pulses to a signal electrode and addressing voltage pulses to a scanning electrode in an addressed condition so as to make an addressed pixel at the crossing position of the signal electrode and the scanning electrode to be a desired molecular orientation state; and applying to the scanning electrode, in a non-addressed condition following the addressed condition, voltage pulses whose frequency is higher than that of the addressing voltage pulses and higher than a frequency in which spontaneous polarization of the ferroelectric liquid crystal can follow and whose average voltage is zero so that the effective value of voltage pulses applied to the pixel in the non-addressed condition becomes a substantially constant value greater than an effective threshold voltage at which a molecular orientation stabilizing effect begins to be produced by the dielectric anisotropy, whereby the state of the pixel made in the addressed condition is held in the non-addressed condition until a next addressed condition.

2. A method as claimed in claim 1, wherein a train of high-frequency voltage pulses equal in frequency to the voltage pulses applied to the scanning electrode in the non-addressed condition are applied to the signal electrode for a part of a time period H of the addressed condition in accordance with a grey level of the addressed pixel thereby changing the pulse width of a voltage pulse applied to the addressed pixel so as to allow the state of the addressed pixel to be the grey level.

3. A method as claimed in claim 2, wherein said train of high-frequency pulses applied to the signal electrode each have a fixed duration and a start time thereof is changed in accordance with the grey level.

4. A method as claimed in claim 3, wherein said train of high-frequency pulses applied to the signal electrode each have a duration of ½ H and the start time thereof is changed from 0 to ½ H in accordance with the grey level.

5. A method as claimed in claim 2, wherein each of said train of high-frequency pulses applied to the signal electrode has approximately double the amplitude of the pulse applied to the scanning electrode.

6. A method as claimed in claim 1, wherein first and second series of AC pulses mutually reverse in polarity sequence are applied to the pixel in one addressed condition, and either the voltage or the pulse duration of at least one series of said AC pulses in the latter half is changed in accordance with the grey level.

7. A method as claimed in claim 6, wherein a grey-scale signal complementary to a desired grey level is superposed on the first-half of the AC pulses.

8. A method as claimed in claim 6, wherein the sequence of any pulses other than the last pulse including the grey-scale signal is changed.

9. A method as claimed in claim 6, wherein said two series of AC pulses are applied through division for two scanning operations.

* * * * *